(12) United States Patent
Rubio

(10) Patent No.: US 9,037,622 B1
(45) Date of Patent: May 19, 2015

(54) SYSTEM AND METHOD FOR MANAGING SPOOL SPACE IN A MIXED SSD AND HDD STORAGE ENVIRONMENT

(71) Applicant: Teradata Corporation, Dayton, OH (US)

(72) Inventor: Paul Rubio, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 230 days.

(21) Appl. No.: 13/706,605

(22) Filed: Dec. 6, 2012

(51) Int. Cl.
*G06F 17/30* (2006.01)
*G06F 12/02* (2006.01)

(52) U.S. Cl.
CPC ........ *G06F 12/0223* (2013.01); *G06F 12/0246* (2013.01)

(58) Field of Classification Search
USPC .......................................................... 707/899
See application file for complete search history.

(56) References Cited

U.S. PATENT DOCUMENTS 7,469,261 B2 * 12/2008 Lee et al. .............................. 1/1
2007/0226266 A1 * 9/2007 Lee et al. ...................... 707/200

* cited by examiner

*Primary Examiner* — Baoquoc N To
(74) *Attorney, Agent, or Firm* — James Stover

(57) ABSTRACT

A system and method for managing soft reserve space within a database system including fast solid state storage devices (SSDs) and traditional hard drive storage device (HDDs). The system and method monitors actual spool use within the database system and dynamically modifies the soft-reserve space as a percentage of total storage space in response to changes in spool use.

14 Claims, 5 Drawing Sheets

SYSTEM AND METHOD FOR MANAGING SPOOL SPACE IN A MIXED SSD AND HDD STORAGE ENVIRONMENT

This application is related to the following commonly-assigned patent, which is incorporated by reference herein:

U.S. Pat. No. 7,562,195; entitled "BALANCED ALLOCATION OF MULTIPLE RESOURCES, OR OF MULTIPLE RESOURCES FROM MULTIPLE PROVIDERS," issued on Jul. 14, 2009.

This application is related to the following co-pending and commonly-assigned patent application, which is incorporated by reference herein:

United States Patent Application Publication Number 2010-0306493, entitled "SYSTEM, METHOD, AND COMPUTER-READABLE MEDIUM FOR OPTIMIZED DATA STORAGE AND MIGRATION IN A DATABASE SYSTEM," by Criselda Carrillo, Paul Rubio, Paul Andersen, and Donn Holtzman; filed on Mar. 27, 2009 as U.S. patent application Ser. No. 12/472,414

FIELD OF THE INVENTION

The present invention relates to data warehouse systems, and more particularly, to an improved system and method for managing spool space in a mixed SSD and HDD storage environment.

BACKGROUND OF THE INVENTION

Solid state storage, in particular, flash-based devices either in solid state disks (SSDs) or on flash cards, is quickly emerging as a credible tool for use in enterprise storage solutions. Ongoing technology developments have vastly improved performance and provided for advances in enterprise-class solid state reliability and endurance. As a result, solid state storage, specifically flash storage deployed in SSDs, is becoming vital for delivering higher performance to servers and storage systems, such as the data warehouse system illustrated in FIG. 1. The system illustrated, a product of Teradata Corporation, is a hybrid data warehousing platform that provides the capacity and cost benefits of hard disk drives (HDDs) while leveraging the performance advantage of solid-state drives (SSDs). As shown the system includes multiple physical processing nodes 101, connected together through a communication network 105. Each processing node may host one or more physical or virtual processing modules, such as one or more access module processors (AMPs). Each of the processing nodes 101 manages a portion of a database that is stored in a corresponding data storage facility including SSDs 120, providing fast storage and retrieval of high demand "hot" data, and HDDs 110, providing economical storage of lesser used "cold" data.

Teradata Virtual Storage (TVS) software 130 manages the different storage devices within the data warehouse, automatically migrating data to the appropriate device to match its temperature. TVS replaces traditional fixed assignment disk storage with a virtual connection of storage to data warehouse work units, referred to as AMPs within the Teradata data warehouse. FIG. 2 provides an illustration of allocation of data storage in a traditional Teradata Corporation data warehouse system, wherein each AMP owns the same number of specific disk drives and places its data on those drives without consideration of data characteristics or usage.

FIG. 3 provides an illustration of allocation of data storage in a Teradata Corporation data warehouse system utilizing Teradata Virtual Storage (TVS). Storage is owned by Teradata Virtual Storage and is allocated to AMPs in small pieces from a shared pool of disks. Data are automatically and transparently migrated within storage based on data temperature. Frequently used hot data is automatically migrated to the fastest storage resource. Cold data, on the other hand, is migrated to slower storage resources.

Teradata Virtual Storage allows a mixture of different storage mechanisms and capacities to be configured in an active data warehouse system. TVS blends the performance-oriented storage of small capacity drives with the low cost-per-unit of large capacity storage drives so that the data warehouse can transparently manage the workload profiles of data on the storage resources based on application of system resources to the usage.

Systems for managing the different storage devices within the data warehouse, such as TVS, are described in U.S. Pat. No. 7,562,195; and United States Patent Application Publication Number 2010-0306493, which are incorporated by reference herein.

To achieve optimal performance, TVS steadfastly attempts to place data with the highest number of accesses (hot data) in locations with the fastest average response times. This works optimally in systems with steady-state allocation/de-allocation patterns since, on average, de-allocations are expected to occur more frequently in locations ideal for future allocations. However, many systems do not exhibit this behavior. In these systems, data is rarely de-allocated, leaving few ideal locations for future allocations.

One of the most important, and most frequently accessed, data structures employed by a Teradata database system is spool space, also referred to as a spool. All users who run queries need workspace at some point in time. This spool space is workspace used for the temporary storage of rows during the execution of user SQL statements.

A spool is very short-lived, but critical for performance. By its very nature, a spool is allocated when needed and subsequently freed. Because of TVS migration of hot data to the fastest locations, there is generally little to no space available in ideal locations as those locations have been populated by extents as the result of migration, preventing TVS from allocating spools to the most ideal (fastest) locations.

DETAILED DESCRIPTION OF THE INVENTION

As a result of TVS migration of hot data to the fastest storage locations within a database system there may be little to no storage space available in ideal locations for the allocation of spools, because the fastest storage locations have been populated by extents as the result of TVS migration. To combat this problem, TVS implemented the concept of a soft-reserve (SF)—locations reserved for special allocation types such as spool. By limiting SF to allocations such as spool, one can better guarantee that fast space is available for spool when desired by the database system.

Figure 1:
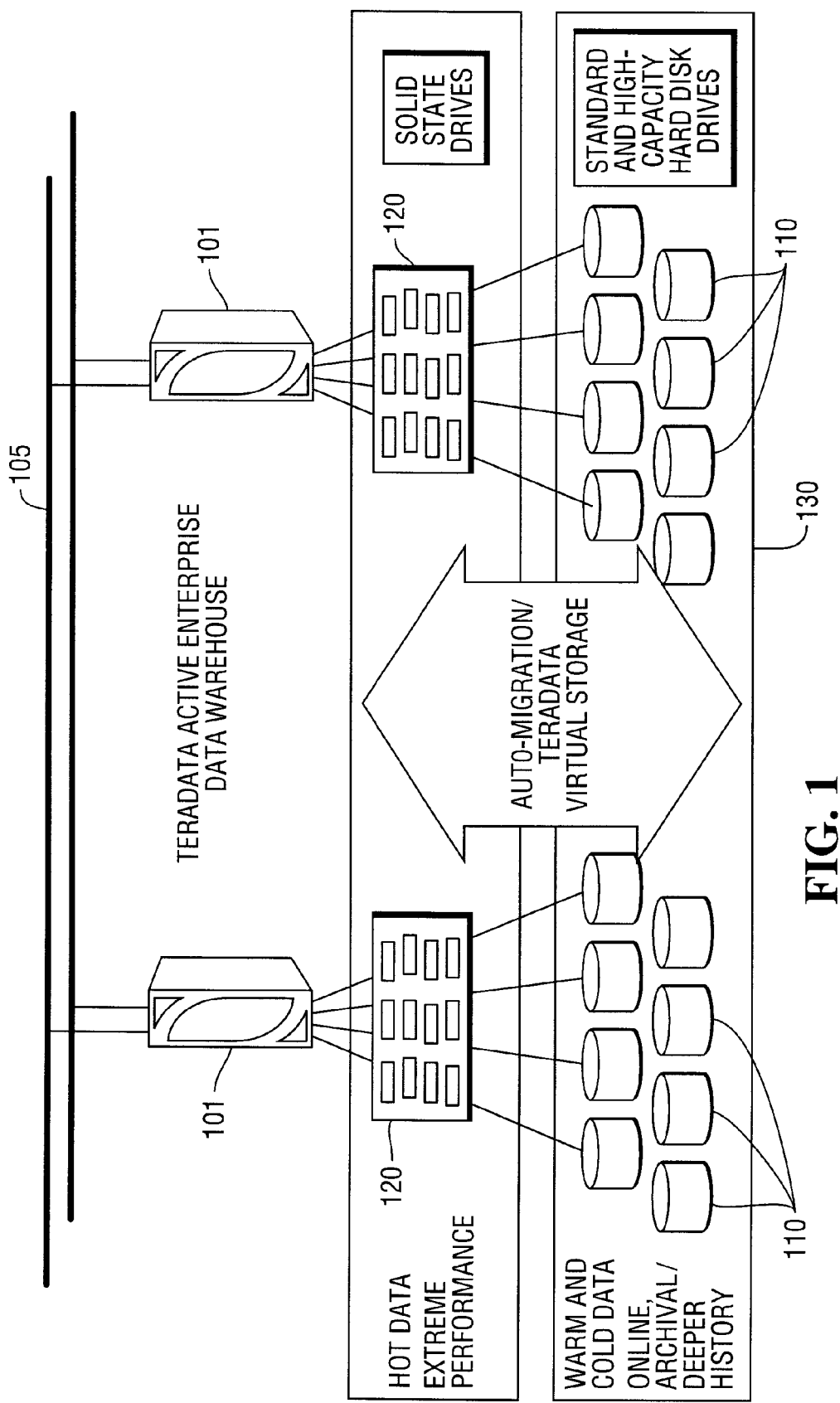
FIG. 1 is an illustration of a multiple-node database system employing SSD storage devices and conventional disk storage devices.
Figure 2:
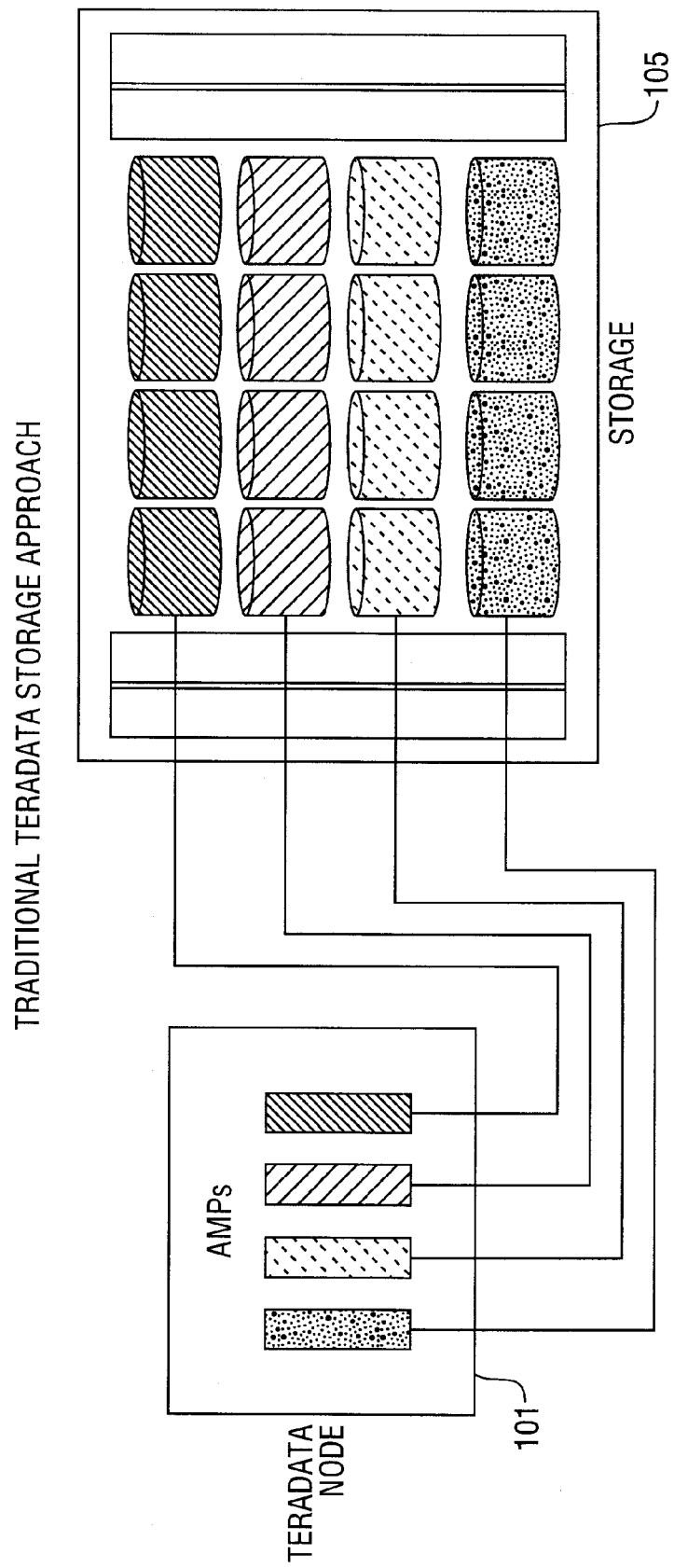
FIG. 2 is a simple illustration of the allocation of data storage in a traditional Teradata Corporation data warehouse system.
Figure 3:
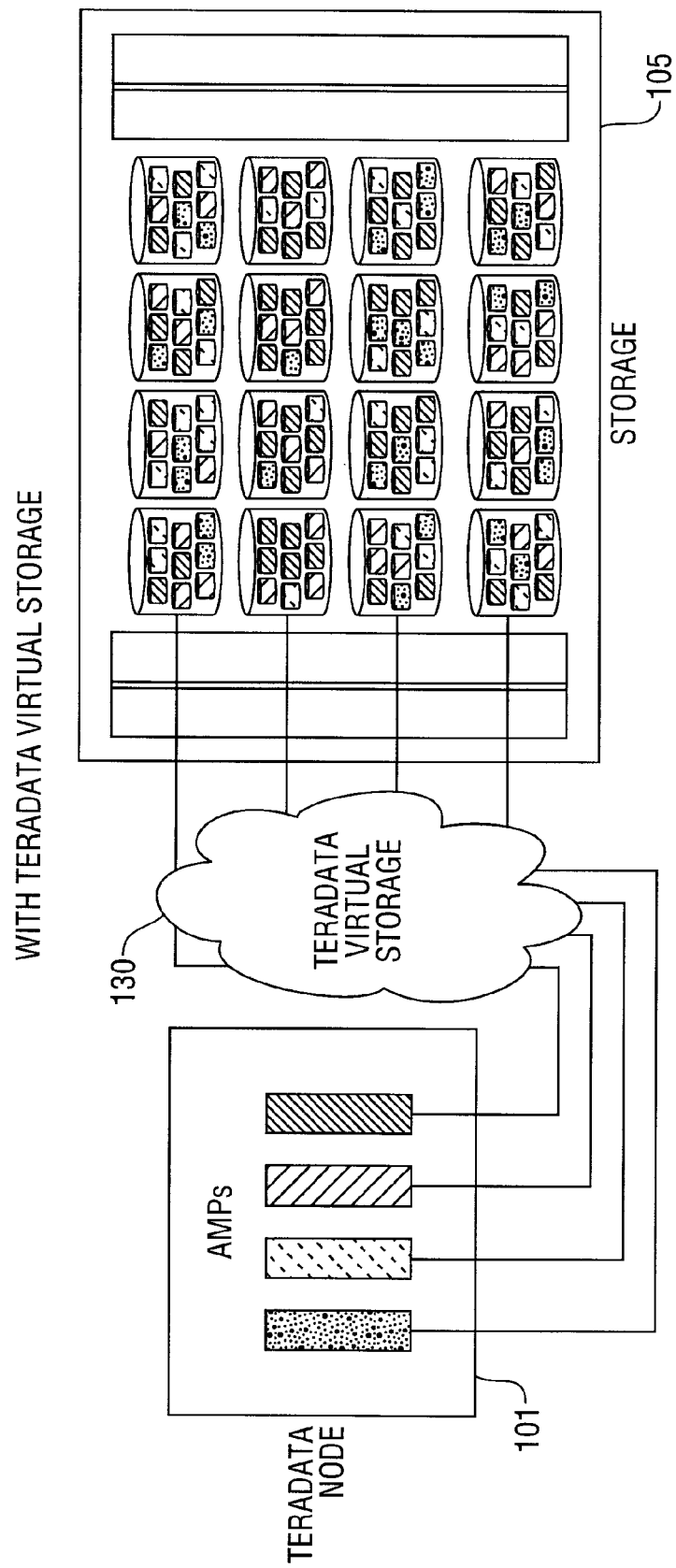
FIG. 3 is a simple illustration of the allocation of data storage in a Teradata Corporation data warehouse system utilizing Teradata Virtual Storage (TVS).
Figure 4:
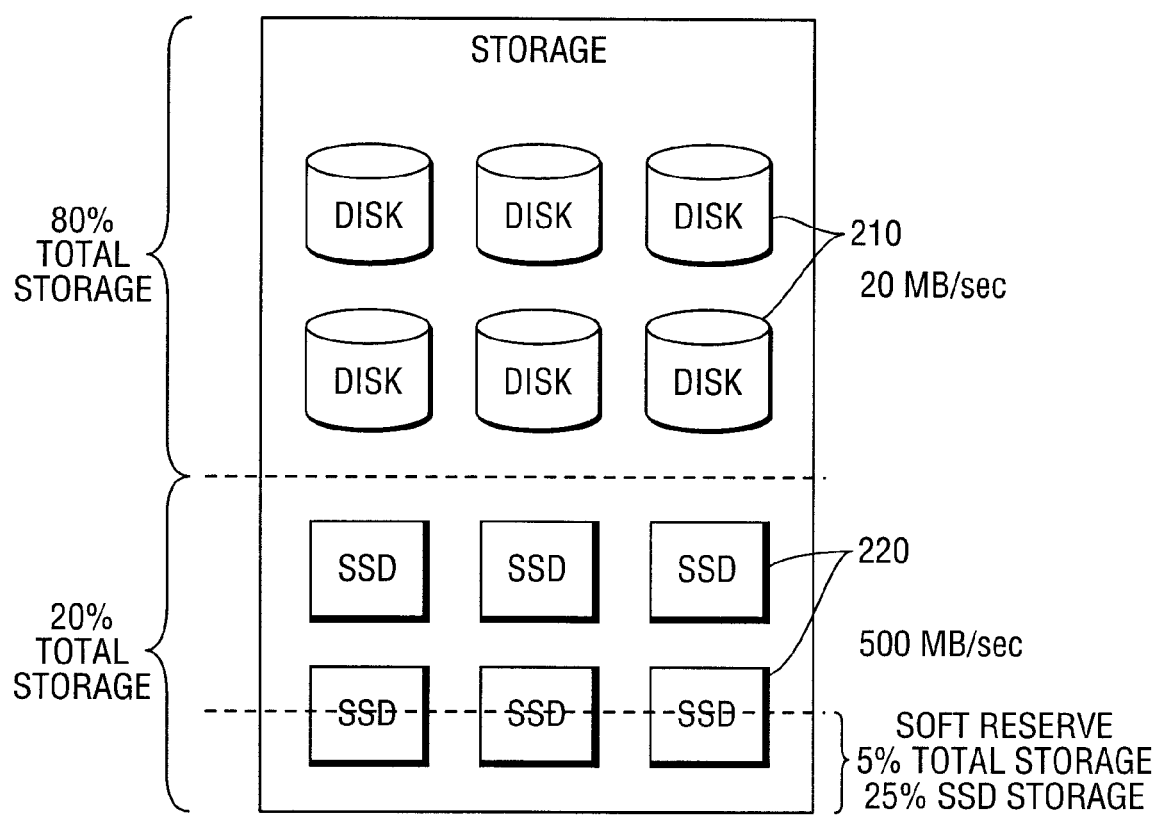
FIG. 4 illustrates the relationship between total disk storage space and storage space soft reserve in an exemplar mixed SSD and HDD storage environment.

On mixed Solid State Drives (SSDs) and Hard Disk Drive (HDD) Teradata database systems, the amount of space placed in SF is a fixed percentage of total space. Under current hybrid configurations this amounts to 5% of total storage space and possibly 25% of SSD storage, as illustrated in FIG. 4. This introduces several problems:

1. Space in soft-reserve is unavailable (potentially a large portion of SSD space) for use by other components of the system, including customer data. Reserving too large a portion of storage space can hamper database system performance if reserved storage space goes unused, while reserving too small a portion of storage space can prevent optimal spool performance.
2. On mixed HDD and SSD storage systems, customers are free to add and remove HDDs. As the amount of managed space changes, so to does spool use. Since SF is fixed to the total storage space, the system might reserve too much or too little storage for SF, depending on how the system is re-configured. Reconfigurations through the addition or removal of HDD storage can interfere with the optimal performance of the database system.
3. Since database systems are typically unique for a customer, some customer workloads may make more use of spool than others. If SF storage space is set to too high a percentage of total storage space, database system performance may be inadvertently hindered.

To address these problems, a method and system for dynamically modifying the soft-reserve space as a percentage of total storage space will now be described.

At any given time, TVS is aware of all spool use. By keeping a running average (constant metric) of spool use, this information can be utilized to alter the amount of storage space reserved for SF. The spool constant metric (SCM) is updated according to the equation:

$$\text{new SCM} = \acute{\alpha}*M + (1-\acute{\alpha})*\text{prior SCM}$$

where:
The initial value for SCM may be a default value or a value selected by the user, for instance, the equivalent of 25% of SSD storage space;
M is equal to a measurement of the number of spool allocated; and
$\acute{\alpha}$ (alpha), also known as step size, or responsiveness, is a configurable parameter that affects how quickly SCM responds to system usage.

By setting $\acute{\alpha}$ appropriately, a user can effectively customize soft-reserve space percentage (SF %) on a per system basis. One method for calculating $\acute{\alpha}$, updating SCM, and determining soft reserve percentage is illustrated in the flowchart of FIG. 5 and described below.

Figure 5:
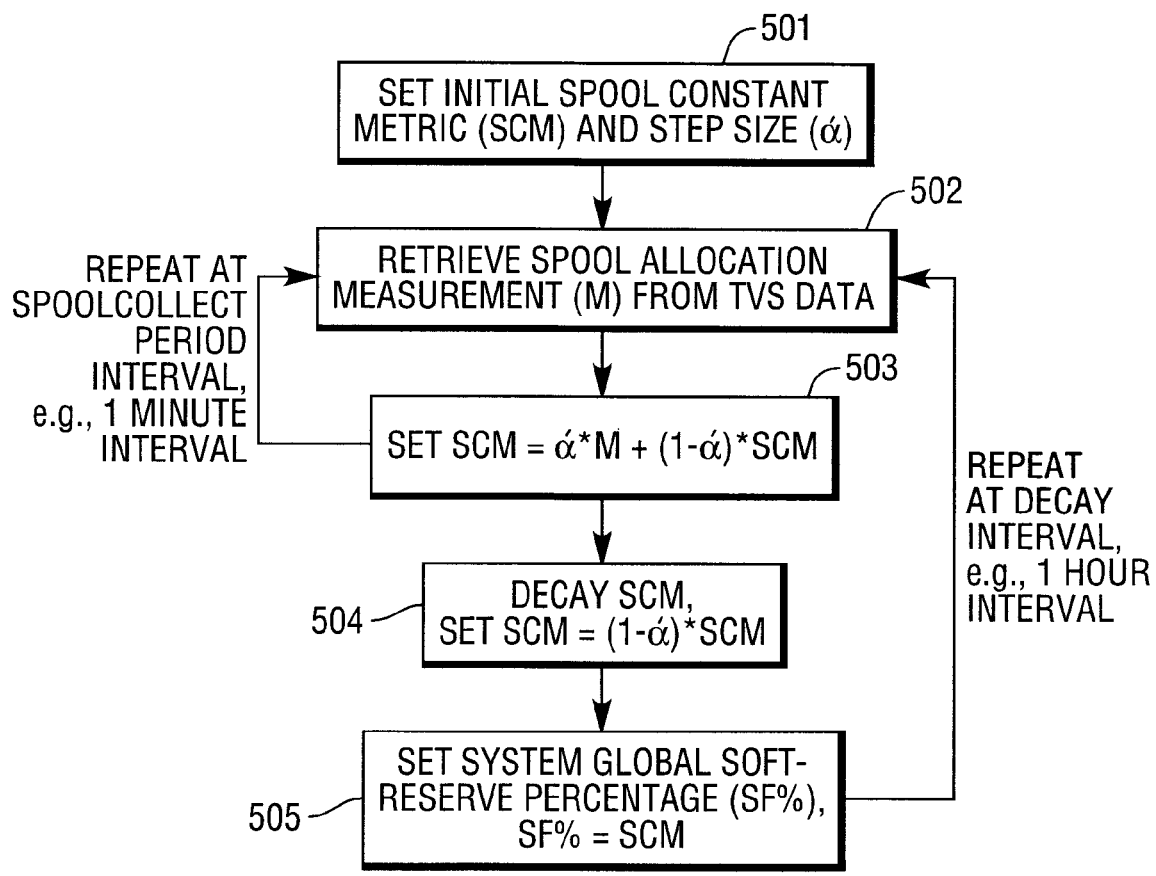
FIG. 5 provides simple flowchart of a process for managing spool space in a mixed SSD and HDD storage environment in accordance with the present invention.

Referring now to FIG. 5, in step 501 the initial spool constant metric (SCM) and step size $\acute{\alpha}$ are determined. The initial value for SCM may be a default value or a value selected by the user, such as 25% of SSD storage space in the hybrid storage configuration illustrated in FIG. 4.

The value of $\acute{\alpha}$ can be calculated as $1-2^{(-SpoolCollectPeriod/TimeToRespond)}$, where SpoolCollectPeriod is a first time interval specifying how often spool use is measured on the system, e.g., 1 minute, and TimeToRespond is a second time interval specifying the time in which the constant metric responds to measurements, e.g., 60 minutes. For a SpoolCollectPeriod of 1 minute, and TimeToRespond value of 60 minutes, $\acute{\alpha}=1-2^{(-1/60)}=0.0114859796471039$.

The spool allocation measurement (M) is retrieved from TVS data in step 502. Using the initial values of SCM and $\acute{\alpha}$, and the spool allocation measurement (M) retrieved from TVS data, the value of SCM is updated in accordance with the equation SCM=$\acute{\alpha}$*M+(1-$\acute{\alpha}$)*SCM in step 503. Following this initial update, a background task is executed every SpoolCollectPeriod or, as above, every minute to retrieve the current spool allocation measurement (M) and continuously update the value of SCM utilizing the most current spool allocation measurement (M), i.e., repeating steps 502 and 503 every minute.

In step 504, a background task for decaying the value of SCM is executed. Decaying is required in order to account for systems whose operating characteristics have changed. For instance, for workloads that use less spool. In these cases, it is beneficial to pull back SF %. In this implementation, the background task for decaying SCM runs every hour to sets SCM=(1-$\acute{\alpha}$)*SCM. If deemed appropriate, a low-water mark can be established to maintain a minimum value for SCM.

After updating and decaying SCM, the value of SCM is applied to the system global SF % parameter, as shown in step 505.

Application of the algorithm described above for a system with a steady-state spool allocation measurement (M) of 20% of SSD and an initial spool constant metric (SCM) value of 25%, the value of SCM will decay to 22.27028041% in 60 minutes. After 240 minutes (4 hours) of measuring 20% spool allocation, the value of SCM will decay to 19.87473998%, and after 250 minutes of measuring 20%, the value for SCM will update to 19.88840601%. Subsequent updates will oscillate around 20%.

By incorporating dynamic soft-reserve functionality, the database system can dynamically determine how much space to set aside for soft-reserve. This feature allows customers to add devices to their systems without impacting performance caused by poorly configured soft-reserve, and the risk of hampering performance by reserving too much or too little soft-reserve for spool use are minimized.

The technique described above can also be applied to space other than soft-reserve, such as to reserve space in the FAST area for use by customer data that has not yet been allocated, i.e., to reserve sufficient space in anticipation of customer data loads requirements.

The foregoing description of the invention has been presented for purposes of illustration and description. It is not intended to be exhaustive or to limit the invention to the precise form disclosed.

Additional alternatives, modifications, and variations will be apparent to those skilled in the art in light of the above teaching. Accordingly, this invention is intended to embrace all alternatives, modifications, equivalents, and variations that fall within the spirit and broad scope of the attached claims.

What is claimed is:

1. A computer-implemented method for managing spool space in a database system including fast and slow storage locations, the method comprising the steps of:
   (a) establishing a soft reserve comprising a percentage of said fast storage locations within said database system, said soft reserve being storage space reserved for special allocation types including spool space;
   (b) setting an initial value for a spool constant metric, said spool constant metric indicating spool use within said database storage locations;

(c) measuring, by said computer, an actual amount of storage space allocated to spool use within said database storage locations;

(d) setting, by said computer, a new value of said spool constant metric by blending said spool allocation measurement with an immediate prior value of said spool constant metric; and (e) setting, by said processor, said soft reserve percentage equal to said new value of said spool constant metric.

2. The method for managing spool space in a database system according to claim 1, the method further comprising the step of:

repeating steps (c) through (d) at a first interval.

3. The method for managing spool space in a database system according to claim 1, the method further comprising the step of:

repeating step (e) at a second interval greater than said first interval.

4. The method for managing spool space in a database system according to claim 1, wherein said new value of said spool constant metric recited in step (d) is updated according to the equation:

$$\text{new SCM} = \acute{\alpha} * M + (1-\acute{\alpha}) * \text{prior SCM},$$

where:

M is equal to a measurement of the amount of storage space allocated to spool use; and $\acute{\alpha}$ (alpha) is a parameter that regulates the amount of change between the new value for SCM and the prior value of SCM.

5. The method for managing spool space in a database system according to claim 4, wherein $\acute{\alpha}$ (alpha) is determined according to the equation:

$$\acute{\alpha} = 1 - 2^{(-SpoolCollectPeriod/TimeToRespond)},$$

where:

SpoolCollectPeriod comprises said first interval; and
TimeToRespond comprises said second interval.

6. The method for managing spool space in a database system according to claim 5, the method further comprising the step of:

decaying the value of said new SCM every second interval prior to step (e), wherein the value of said new SCM is decayed according to the equation:

$$\text{decayed SCM} = (1-\acute{\alpha}) * \text{new SCM}.$$

7. The method for managing spool space in a database system according to claim 1, wherein:

said fast storage locations comprise solid state storage devices (SSDs); and said slow storage locations comprise hard disk storage devices (HDDs).

8. A database system comprising:

fast and slow storage locations, wherein said database system maintains a soft reserve comprising a percentage of said fast storage locations within said database system, said soft reserve being storage space reserved for special allocation types including spool space, wherein said database system also maintains a spool constant metric, said spool constant metric having a value indicating spool use within said database storage locations; and a processor for executing a series of tasks for managing spool space in said database system, said processor executing the tasks of:

(a) measuring an actual amount of storage space within said database storage locations allocated to spool use;

(b) setting a new value of said spool constant metric by blending said spool allocation measurement with an immediate prior value of said spool constant metric; and (c) setting, by said processor, said soft reserve percentage equal to said new value of said spool constant metric.

9. The database system according to claim 8, wherein:

said processor repeats tasks (a) through (b) at a first interval.

10. The database system according to claim 8, wherein:

said processor repeats tasks (c) at a second interval greater than said first interval.

11. The database system according to claim 8, wherein said new value of said spool constant metric recited in step (b) is updated according to the equation:

$$\text{new SCM} = \acute{\alpha} * M + (1-\acute{\alpha}) * \text{prior SCM},$$

where:

M is equal to a measurement of the amount of storage space allocated to spool use; and $\acute{\alpha}$ (alpha) is a parameter that regulates the amount of change between the new value for SCM and the prior value of SCM.

12. The database system according to claim 11, wherein $\acute{\alpha}$ (alpha) is determined according to the equation:

$$\acute{\alpha} = 1 - 2^{(-SpoolCollectPeriod/TimeToRespond)},$$

where:

SpoolCollectPeriod comprises said first interval; and
TimeToRespond comprises said second interval.

13. The database system according to claim 12, wherein:

said processor further executes the task of:

decaying the value of said new SCM every second interval prior to step (c), wherein the value of said new SCM is decayed according to the equation:

$$\text{decayed SCM} = (1-\acute{\alpha}) * \text{new SCM}.$$

14. The database system according to claim 8, wherein:

said fast storage locations comprise solid state storage devices (SSDs); and said slow storage locations comprise hard disk storage devices (HDDs).

* * * * *